(12) United States Patent
Haas

(10) Patent No.: US 8,142,128 B1
(45) Date of Patent: Mar. 27, 2012

(54) ANCHOR AND METHOD FOR ANCHORING

(76) Inventor: James Haas, Bridgewater, NJ (US)

( * ) Notice: Subject to any disclaimer, the term of this patent is extended or adjusted under 35 U.S.C. 154(b) by 454 days.

(21) Appl. No.: 12/358,578

(22) Filed: Jan. 23, 2009

Related U.S. Application Data

(63) Continuation-in-part of application No. 10/772,662, filed on Feb. 5, 2004, now abandoned.

(51) Int. Cl.
*F16B 37/12* (2006.01)

(52) U.S. Cl. ......... 411/438; 108/180; 411/457; 411/442

(58) Field of Classification Search .................. 403/348, 403/349, 353; 411/457, 442, 443, 444, 438; 108/153.1, 157.13, 180, 181, 190, 192, 193; 312/110, 111
See application file for complete search history.

(56) References Cited

U.S. PATENT DOCUMENTS

| | | |
|---|---|---|
| 226,453 A | 4/1880 | Kelly |
| 2,033,039 A | 3/1936 | Limpert |
| 2,205,550 A | 6/1940 | Wehr |
| 2,354,810 A | 8/1944 | Haas et al. |
| 2,407,879 A | 9/1946 | Haas |
| 2,668,304 A | 2/1954 | Murray |
| 2,809,067 A | 10/1957 | Macchi |
| 3,176,979 A | 4/1965 | Englemann |
| 3,222,744 A | 12/1965 | Dellith |
| 3,386,763 A | 6/1968 | Ottoway et al. |
| 3,634,178 A | 1/1972 | Goodman |
| 3,813,094 A | 5/1974 | Walton et al. |
| 3,849,839 A | 11/1974 | Zimber |
| 3,964,364 A | 6/1976 | Poe |
| 4,003,549 A | 1/1977 | Sergerie |
| 4,007,516 A | 2/1977 | Coules |
| 4,009,786 A | 3/1977 | Littlewood |
| 4,165,811 A | 8/1979 | Mainvielle |
| 4,308,646 A | 1/1982 | Schenk |
| 4,338,836 A | 7/1982 | Kuchler |
| 4,474,489 A | 10/1984 | Simon |
| 4,498,827 A | 2/1985 | Mair |
| 4,505,468 A | 3/1985 | Heisler |
| 4,518,277 A | 5/1985 | Bush et al. |
| 4,526,363 A | 7/1985 | Fort |
| 4,532,622 A | 7/1985 | Newbold |
| 4,605,216 A | 8/1986 | DeWitt et al. |
| 4,641,826 A | 2/1987 | van der Weide |
| 4,645,193 A | 2/1987 | Walton et al. |
| 4,705,442 A | 11/1987 | Fucci |
| 4,711,596 A | 12/1987 | Bruderer |
| 4,761,027 A | 8/1988 | Gehrig |
| 5,007,616 A | 4/1991 | Scarpino |

(Continued)

*Primary Examiner* — Jose V Chen
(74) *Attorney, Agent, or Firm* — Thomas L. Adams

(57) ABSTRACT

An anchor that can fasten to a fibrous or pierceable substrate employs a base with a spaced pair of bores. A pair of hubs are rotatably mounted to axially reciprocate in the pair of bores between a retracted and a deployed position. Each of the hubs has on one side thereof a plurality of spiral prongs. The spiral prongs on one of the hubs spiral in the opposite direction from the spiral prongs on the other one of the hubs. The hubs when in the deployed position project the plurality of prongs beyond the base. A thrust member mounted over the pair of hubs can thrust them from the retracted to the deployed position. With the hubs placed side by side and with the spiral prongs against the substrate, the hubs can be rotated in opposite directions to embed the spiral prongs in the substrate. An object can then be anchored by being lashed to the hubs.

20 Claims, 4 Drawing Sheets

U.S. PATENT DOCUMENTS

| | | |
|---|---|---|
| 5,133,617 A | 7/1992 | Sokn et al. |
| D367,438 S | 2/1996 | Schriever |
| 5,496,021 A | 3/1996 | Bellio et al. |
| D374,609 S | 10/1996 | Akeno |
| 5,624,167 A | 4/1997 | Katz |
| 5,651,570 A | 7/1997 | Schrum et al. |
| 5,728,116 A | 3/1998 | Rosenman |
| 5,873,379 A | 2/1999 | Bouix |
| 5,899,621 A | 5/1999 | Wang |
| 6,123,035 A | 9/2000 | Pfister |
| 6,296,656 B1 | 10/2001 | Bolduc et al. |
| 6,336,766 B1 | 1/2002 | De Villele |
| 6,468,309 B1 * | 10/2002 | Lieberman .................. 623/17.11 |
| 6,494,657 B2 | 12/2002 | Unsworth et al. |
| 6,520,464 B1 | 2/2003 | Morrissey et al. |
| 6,616,369 B2 | 9/2003 | Clark |
| 6,726,421 B2 | 4/2004 | Giannakakos et al. |
| 6,726,422 B2 | 4/2004 | Giannakakos et al. |
| 7,100,854 B2 | 9/2006 | Aby-Eva et al. |
| 2004/0069980 A1 | 4/2004 | Shannon |

\* cited by examiner

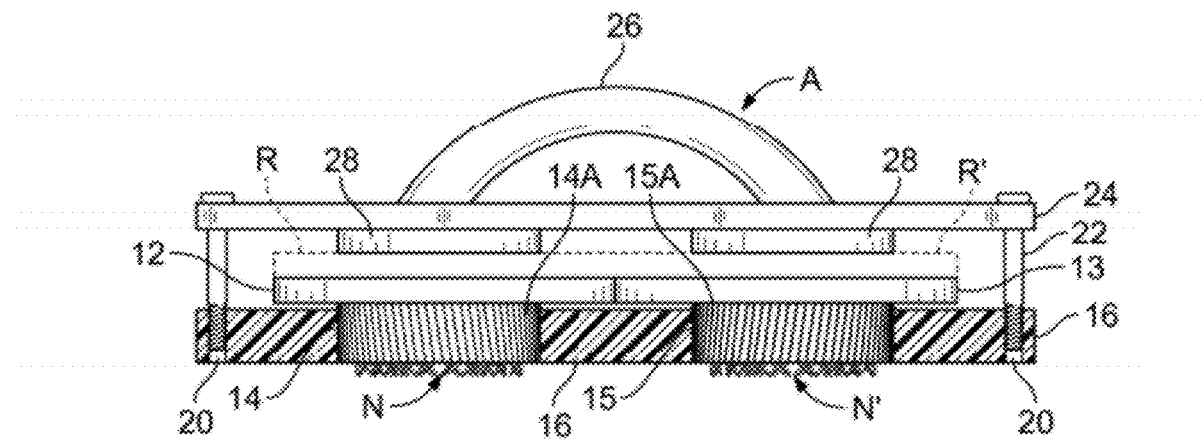
FIG. 2
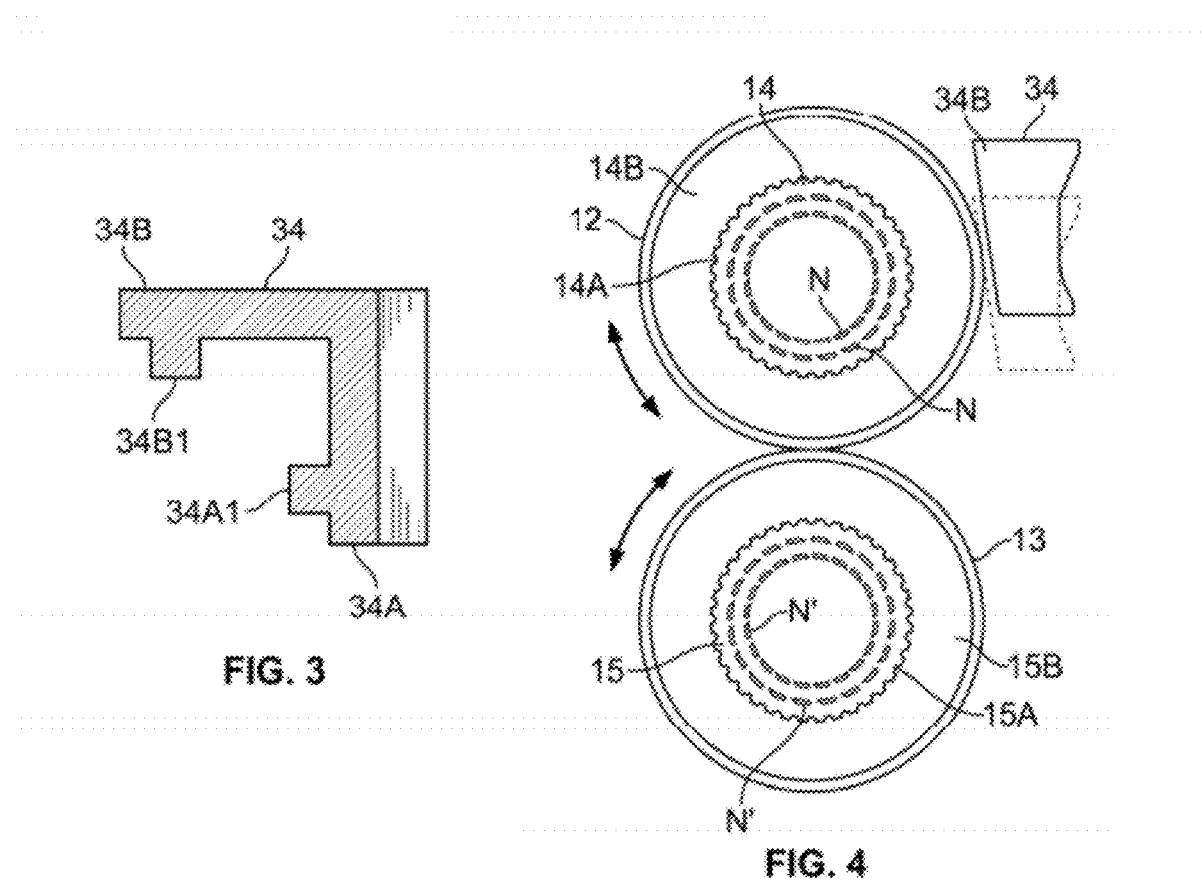
FIG. 3
FIG. 4

ANCHOR AND METHOD FOR ANCHORING

CROSS-REFERENCES TO RELATED APPLICATIONS

This application claims the benefit of U.S. patent application Ser. No. 10/772,662, filed Feb. 5, 2004, the contents of which are hereby incorporated by reference herein.

BACKGROUND OF THE INVENTION

1. Field of the Invention

The present invention relates to anchors and anchoring methods, and in particular, to anchors using rotating hubs.

2. Description of Related Art

Cargo can shift when being transported by an automobile, van, truck, boat, airplane, or other vehicle. The cargo can be damaged and may produce distracting noises during transport. In some cases shifting cargo can cause a load imbalance affecting the steering of the vehicle. In still other cases, shifting cargo may shift so much as to strike and injure a vehicle occupant.

For this reason, cargo is often tied down with straps or cords and vehicles are often provided with cleats or other structure for this purpose. However, in many cases the vehicle has inadequate tiedown structure or the cargo may have an unusual shape making tiedown difficult. For example, a small object adjacent a large one may require a separate tiedown in the middle of a cargo floor. However, scattering multiple tiedown structures across a cargo floor is impractical, especially when the need for such intermediate tiedown structure is rare. Moreover, even if many tiedown structures are scattered throughout the vehicle, the tiedown points are still discrete and finite, and one cannot finely adjust the position of the tiedown point.

In the absence of tiedown structure, a vehicle can be retrofitted with hardware facilitating the securing of cargo. This will often require drilling mounting holes that may weaken the vehicle's structure or compromise noise or weather insulation. Moreover, if cargo transport is infrequent, such tiedown structure can be obtrusive.

Anchoring objects to carpets or other fibrous material can be problematic. In particular, one would like to avoid cutting or altering the material in a way that degrades its strength or appearance. Also, while the hook panel of a hook and loop fastener will sometimes adhere to the loops of a carpet, this fastening ability tends to be inconsistent and unreliable.

Besides lashing cargo, anchors may be used with stays that hold an object erect. For example, at an exhibition stays may connect from anchors on the floor, wall or other support surface to a tall sign, pedestal, pole, etc. Also, anchors may hold a tether that connects to a pet or to some object that needs to remain in a certain vicinity.

See also U.S. Patent Application Publication No. 2004/0069980 and the following U.S. Pat. Nos. D367,438; D374,609; 226,453; 2,033,039; 2,205,550; 2,354,810; 2,407,879; 2,668,304; 2,809,067; 3,176,979; 3,222,744; 3,386,763; 3,634,178; 3,813,094; 3,849,839; 3,964,364; 4,003,549; 4,009,786 4,007,516; 4,165,811; 4,308,646; 4,338,836; 4,498,827; 4,505,468; 4,518,277; 4,526,363; 4,605,216; 4,641,826; 4,645,193; 4,705,442; 4,761,027; 5,007,616; 5,496,021; 5,624,110; 5,624,167; 5,728,116; 6,296,656; 6,468,309; 6,494,657; 6,520,464; 4,474,489; 4,532,622; 4,711,596; 5,133,617; 5,651,570; 5,873,379; 5,899,621; 6,123,035; 6,336,766; 6,616,369; 6,726,421; 6,726,422; and 7,100,854.

SUMMARY OF THE INVENTION

In accordance with the illustrative embodiments demonstrating features and advantages of the present invention, there is provided an anchor for fastening to a fibrous or pierceable substrate. The anchor includes a base with a spaced pair of bores. Also included is a pair of hubs rotatably mounted to axially reciprocate in the pair of bores between a retracted and a deployed position. Each of the pair of hubs has on one side thereof a plurality of spiral prongs. The spiral prongs on one of the hubs spirals in the opposite direction from the spiral prongs on the other one of the hubs. The hubs when in the deployed position project the plurality of prongs beyond the base. The anchor also includes a thrust member mounted over the pair of hubs and operable to thrust them from the retracted to the deployed position.

In accordance with another aspect of the invention a method is provided for anchoring an object to a fibrous or pierceable substrate. The method employs a pair of hubs with spiral prongs that spiral in opposite directions. The method includes the step of placing the pair of hubs side by side with the spiral prongs against the substrate and spiraling in opposite directions. Another step is rotating the hubs in opposite directions to embed their spiral prongs in the substrate. The method also includes the step of lashing the object to both of the hubs to anchor the object.

In accordance with yet another aspect of the invention an anchor is provided for fastening to a fibrous or pierceable substrate. The anchor includes a base with a spaced pair of bores, one with a right hand thread and the other with a left hand thread. Also included is a pair of hubs rotatably mounted to axially reciprocate in the pair of bores between a retracted and a deployed position. The pair of hubs is threaded to complement threading of the pair of bores. The pair of hubs has a pair of flanges to roll against each other and revolve in opposite directions. Each of the pair of hubs has on one side thereof a plurality of spiral prongs. The spiral prongs on one of the hubs spirals in the opposite direction from the spiral prongs on the other one of the hubs. Each of the spiral prongs turn less than $\frac{1}{16}$ of a turn, and each rises less than its overall length. The hubs when in the deployed position project the plurality of prongs beyond the base. The anchor also includes a thrust plate with a U-shaped strut mounted over the pair of hubs and operable to thrust them from the retracted to the deployed position. Also included is a plurality of springs mounted between the base and the thrust plate. The anchor also includes a locking member slidably mounted on the base for wedging against at least one of the pair of hubs to prevent movement thereof.

By employing apparatus and methods of the foregoing type an improved anchoring technique is achieved. In a disclosed embodiment a pair of hubs are mounted side-by-side in the bores of a base plate. In this embodiment the hubs and the bores have threads or splines arranged so that the hubs turn as they move through the bores. The hubs and bores are threaded differently so that the hubs rotate in opposite directions as they rise or descend together in the bores. The hubs have flanges that act like wheels that touch and roll together, again causing the hubs to rotate in opposite directions.

The hubs or spring biased so they tend to rise to a retracted position. A thrust plate is mounted on the base plate above the hubs and can be pressed against the hubs so they descend and turn through the bores into a deployed position. A slider on the base plate can wedge against one of the flanges of the hub to lock it and its complementary hub in position.

The faces of the hubs opposite the thrust plate are fitted with a number of spiral prongs that may be considered helical.

These prongs are relatively short and in many embodiments will be less than 1/16 of a turn, although the turning angle will vary with the size of the hub holding the prong.

Because of their relative shortness, the manufacturing of the prongs can be simplified. Specifically, the prongs may be made to follow the arc of a circle, that is, each prong may lie along a plane and need not follow the three dimensional path of a true helix. In a disclosed embodiment, each prong may lie in a relatively shallow plane, for example, a plane with an angle of elevation of about 30°.

An anchor designed in this manner can be very easily installed. A user need only place the device against a surface that is fibrous or is easily pierced by prongs. Then the user presses the thrust plate against the hubs to rotate them and their prongs. The two sets of prongs spiral into the underlying material in opposite directions. A slider can then be wedged against one of the hubs to maintain the angular orientation of both hubs and to keep the prongs anchored in the underlying material. This operation can be performed quickly and with a single hand.

Typically, a pair of anchors are placed on opposite sides of an object so that a cord can be tied to the anchors and lashed over the object. Each anchor may be provided with a semicircular loop to facilitate tying a cord to the anchor. In other instances the anchors may be used to anchor stays or guy wires. Alternatively, a leash or tether can be attached to the anchor to restrict movement of a tethered object. In any event, the anchoring point can be adjusted an finely as desired, making the anchor highly adaptable to a variety of unexpected situations.

BRIEF DESCRIPTION OF THE DRAWINGS

The above brief description as well as other objects, features and advantages of the present invention will be more fully appreciated by reference to the following detailed description of illustrative embodiments in accordance with the present invention when taken in conjunction with the accompanying drawings, wherein:

FIG. 2 is a side view of the anchor of FIG. 1 assembled;

FIG. 3 is a cross-sectional view taken through the middle of the slider of FIG. 1;

FIG. 4 is a diagram of the needle side of the hubs together with the slider of FIG. 3;

DETAILED DESCRIPTION OF THE PREFERRED EMBODIMENTS

Figure 1:
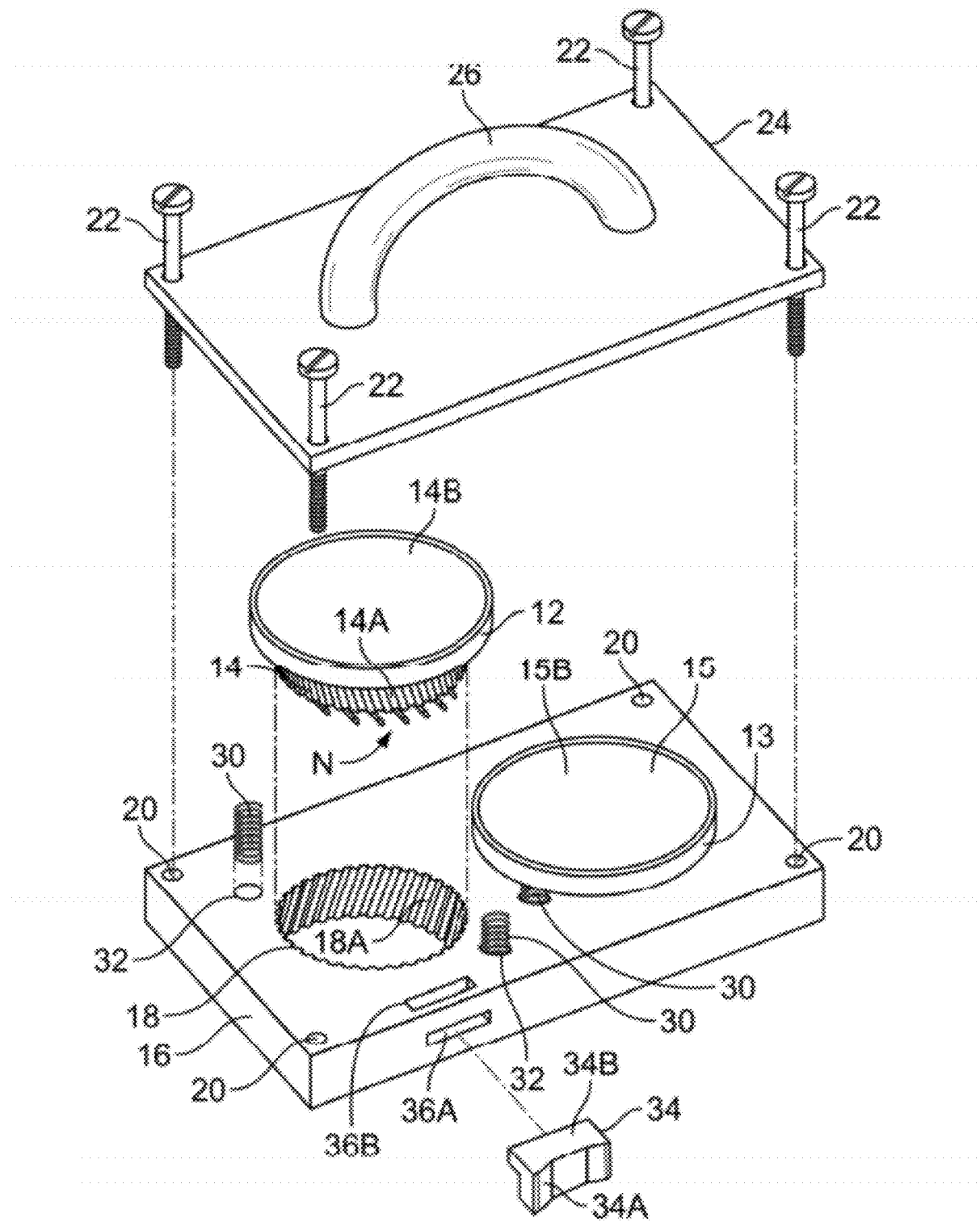
FIG. 1 is an exploded, perspective view in of an anchor in accordance with principles of the present invention.

Referring to FIGS. 1 and 2, an anchor A is shown employing a base 16 in the form of a rectangular plate with a spaced pair of cylindrical through bores, only one of them, bore 18, being visible in FIG. 1. Bore 18 is internally threaded and is shown with left-hand threads 18A.

Base 16 has at each corner a threaded hole 20. Screws 22 slide through holes in the four corners of rectangular thrust plate 24 and are screwed into holes 20 in base 16. Accordingly, plate 24 (also referred to as a thrust member) is captured on base 16 but can move relative to the base, normally remaining parallel thereto.

The outer side of plate 24 has a U-shaped, arching strut 26 shaped much like a sector of a toroid, although other shapes are contemplated. A cord, strap, elastic band, line or other type of lash can be tied to strut 26. Strut 26 can have a variety of shapes and in some cases may be a simple hook or eye bolt. Alternatively, holes may be formed in thrust plate 24 so that a line can be laced through the holes and then tied to the thrust plate 24. In still other cases, the thrust plate 24 may have notches that allow one to tie a line to the thrust plate. While the foregoing described tying, in some cases a line may have hooks, clips, buckles and other similar means for attaching to thrust plate 24. In fact, buckles or other fasteners may be attached to thrust plate 24 to hold a line.

Attached to the inside face of thrust plate 24 are a spaced pair of short cylindrical glides 28. Glides 28 may be made of a low friction material such as Teflon™ plastic. Glides 28 are designed to press down against the top of hubs 14 and 15 while allowing them to rotate relative to the glides. Helical springs 30 (also referred to as yielding members) are mounted in blind holes 32 at diametrically opposite positions around bore 18 to engage the underside of flange 14B. When thrust plate 24 and its glides 28 depress hub 14, then flange 14A compresses helical springs 30 allowing hub 14 to reach the deployed position shown in FIG. 2; otherwise springs 30 drive hub 14 to the retracted position R shown in phantom in FIG. 2.

Hub 14 is shown as a cylinder with left hand threads 14A complementing threads 18A of bore 18. Hub 14 is capped by a disc (i.e., flange) 14B that is encircled by elastomeric band 12. The inclination of threads 14A relative to the hub's axis at any one point on a thread is approximately 30°. However, a different angle may be used in other embodiments, but that angle will tend to be consistent with the inclination of the prongs described hereinafter.

In this embodiment the threaded portion of hub 14 is approximately 1.0 inch (2.5 cm) tall and 2.5 inches (6.4 cm) in diameter, while flange 14B is 3.0 inches (7.6 cm) in diameter. Flange 14B is about ½ inch (1.3 cm) tall so the overall height of hub 14 with flange 14B is 1.5 inch (3.8 cm). It will be understood that these dimensions can vary depending on space considerations, the desired anchoring strength, etc.

Hub 14 and its flange 14B may be an integral, plastic molded piece, although separate pieces may be employed instead. In some embodiments hub 14 and flange 14B may be hollow. Also, instead of plastic the hub and flange may be made from metal, ceramic, wood, or other materials. Band 12 may be made of polyurethane or other slip-resistant materials. In some cases the outside surface of band 12 can be knurled or have teeth to avoid slipping. In some embodiments band 12 may be eliminated and teeth or knurling may be placed on the edge of flange 14B to prevent slipping.

It will be understood that hub 15 is adjacent to hub 14 and has a band 13 that engages band 12 of hub 14 as shown in FIG. 2. Bands 12 and 13 are identical. Also, hubs 14 and 15 are identical except that one is the mirror image of the other. Accordingly, threads 15A are right hand threads that engage right hand threads in its complimentary bore in base 16. Thus when glides 28 depress hubs 14 and 15 they descend in unison to the deployed positions shown in FIG. 2 with the bands 12 and 13 remaining in contact.

If unrestrained, hub 15 is driven to the retracted position R' shown in phantom in FIG. 2 by two diametrically opposite springs 30 (only one visible in FIG. 1) that engage the underside of flange 15B. Having opposite threading, hubs 14 and 15 rotate in opposite directions as they move in unison through their respective bores.

Referring to FIGS. 1-4, a locking member is shown as a slider 34 having a curved upright wall 34A supporting a transverse, cantilevered wall 34B. The inside faces of walls 34A and 34B each have a rectangular nub 34A1 and 34B1, respectively. Nubs 34A1 and 34B1 extend only about one third of the overall length of slider 34 and are longitudinally centered. Nubs 34A1 and 34B1 snap into slots 36A and 36B to allow slider 34 to slide between the two positions shown in FIG. 4, one shown in full, the other shown in phantom. The edge of wall 34B is bevelled so when slider 34 is pulled back (phantom position of FIG. 4) that edge engages band 12 to act as a brake. Whenever hub 14 is stopped in this manner the frictional engagement between bands 12 and 13 will also stop hub 15 from rotating.

Hubs 14 and 15 have a plurality of spiral prongs N and N', respectively. Prongs N are arranged in two circular concentric rows of twenty prongs each, that is, forty altogether on each hub. Prongs N' are shaped and distributed identically, except for being a mirror image of the arrangement of prongs N.

Figure 5:
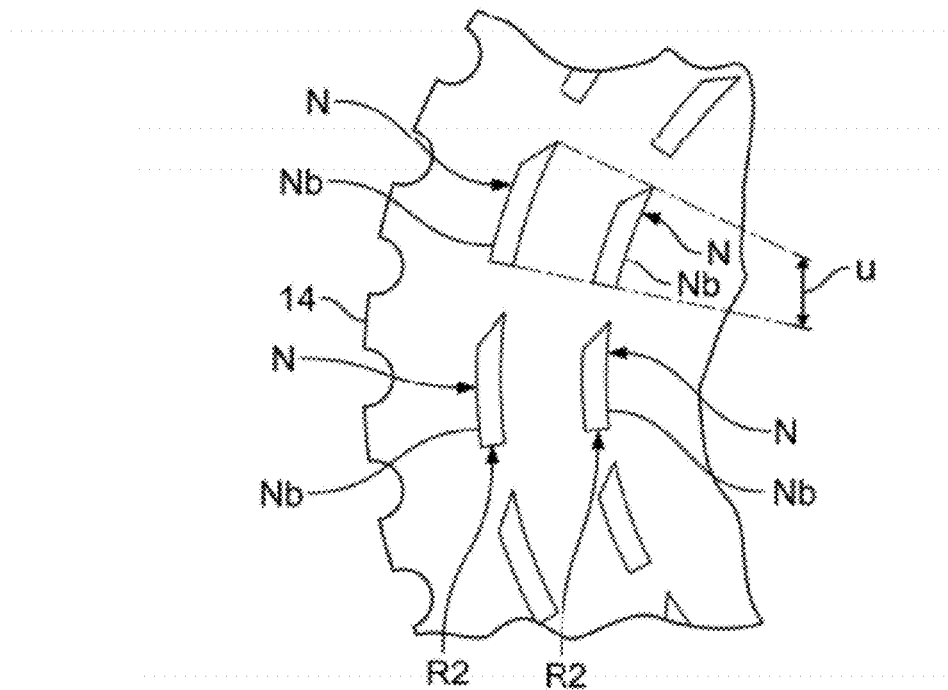
FIG. 5 is a fragmentary, bottom view of one of the hubs and prongs of FIG. 2.
Figure 6:
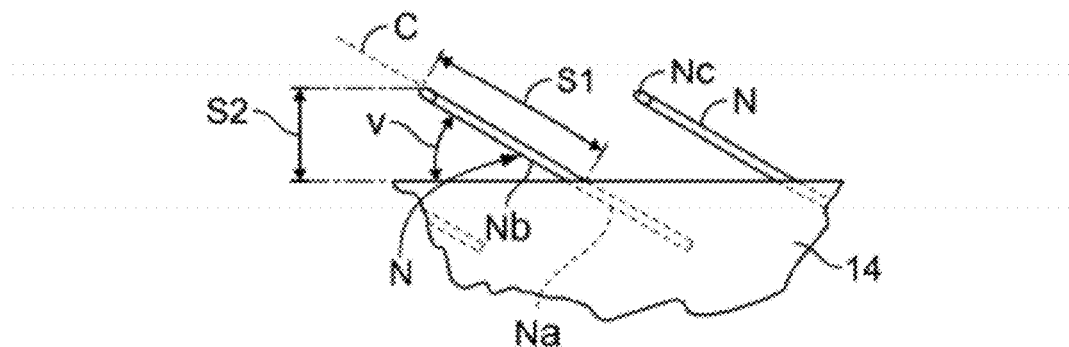
FIG. 6 is a fragmentary side view of the hub and prongs of FIG. 5.

Referring to FIGS. 5 and 6, prongs N are shown arranged into concentric circular rows identified as an outside row R1 and an inside row R2. The outside row is illustrated by itself in FIG. 6. Each prong N has a portion Na embedded in hub 14 to support an exposed portion Nb having an overall exposed length s1. Portion Na may be embedded by being molded in place. In this embodiment prongs N have a circular cross-section and their distal tips are sharpened by being ground at an angle to produce an elliptical feature Nc. However, different cross-sections are contemplated and sharpening is optional.

Embedded prong portion Na is straight and lies in an upright reference plane that is parallel to the axis of hub 14 and tangent to the circle defining the prong row (in FIG. 6 row R1). This point of tangency is defined at the transition between portion Na and portion Nb. Both portions Na and Nb lie in a canted plane C that is perpendicular to the reference plane. This canted plane C intersects the axis and the surface of hub 14 at angle v, which defines the angle of elevation of prong N.

The exposed portion Nb of prong N is shown curved in FIG. 5, which is a plan view and therefore essentially a projection of prongs N onto the surface of hub 14. Prongs N are shown there following circular paths associated with their respective rows R1 and R2; although strictly speaking, to project onto a circle, prong portion Nb would follow an elliptical path in canted plane C. While exposed portion Nb can follow such an elliptical path to project the ideal circular path, as a practical matter there is almost no significant difference between bending the portion Nb into this elliptical path or approximating the elliptical path with a circular bend. This follows from the fact that prong portion Nb follows a relatively small turning arc u of about 15°. In particular, since there are twenty prongs N per row, the prong to prong spacing is 18°.

Figure 7:
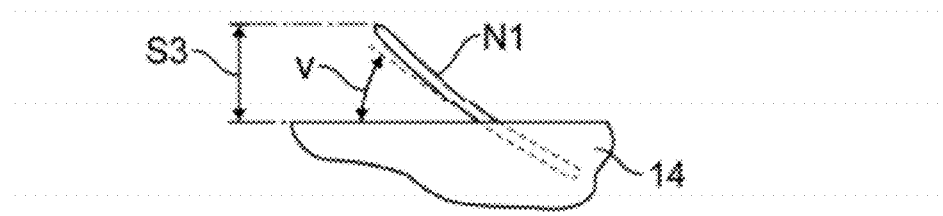
FIG. 7 is a fragmentary side view of a hub and prongs that is an alternate to that of FIG. 6.

Ideally, the exposed portions of the prongs will follow a helical path and therefore will not lie on a plane. FIG. 7 shows a prong N1 whose exposed portion follows such a helical path. A line tangent to such a path can be set to have the same angle of elevation v as before, but, being helical, the path will rise faster and reach a greater height s3 for the same turning arc.

Referring again to FIG. 6, prongs N should be thin enough and long enough to pierce and efficiently anchor to the target material. If the prongs are too thin they will tend to bend and will not effectively penetrate the target material and stay anchored thereto. Also, if the prongs are too long, they may require rotation through a greater angle, which will tend to slow the speed of penetration and increase the torque needed to penetrate. In addition, the angle of elevation v of prongs N should be steep enough to ensure that the prongs penetrate to a sufficient depth without skimming over the surface of the target material. On the other hand, an excessively steep angle of penetration will provide insufficient anchoring strength and the prongs will tend to slip out of the target material.

For prongs intended to anchor onto loop pile carpeting (e.g., carpeting with a 3 mm deep carpet pile and a 4 mm loop circumference) an exposed prong length s1 of 0.25 to 0.35 inch (6.4 to 8.9 mm) at an angle of elevation of 30°±10° works satisfactorily. For the embodiment of FIG. 6 prong N will have a nominal rise s2 of 0.15 inch (3.8 mm). For the embodiment of FIG. 7 rise s3 will be nominally 0.19 inch (4.8 mm). For effective anchoring, the exposed length s1 will exceed the rise (rise s2 in FIG. 6 and rise s3 in FIG. 7). In one embodiment prongs N were made of steel piano wire, 0.033 inch (0.84 mm) in diameter.

Prongs N readily engage the loops in loop pile carpeting, but it will be understood that the foregoing anchor will also work with cut-pile carpets, although the length of prongs N may be increased somewhat to account for the lack of loops. In any event, the prong length can be chosen to provide the desired anchoring strength in the intended application. Therefore, it will be understood that the foregoing dimensions and materials can be varied depending upon the desired anchoring strength, target material, desired angle of rotation, strength of the prongs, etc.

Also, if the prong-bearing hub will have a greater diameter, the number of prongs per row can be scaled up appropriately while keeping approximately the same prong length. So if, for example, the hub diameter is doubled in comparison to the foregoing embodiment, the number of prongs will be doubled as well for the same prong length.

As explained further hereinafter, prongs N and N' can be fastened to carpeting, cloth, felt, sheet plastic, styrofoam, a penetratable clay foundation, etc. The length, number, spacing, angle of elevation and other characteristics of prongs N and N' may be altered to accommodate these different penetratable materials.

To facilitate an understanding of the principles associated with the foregoing apparatus, its operation will be briefly described. In the neutral position of anchor A, thrust plate 24 will be spaced from base 16 as shown in FIG. 2. Also, springs 30 (FIG. 1) will lift hubs 14 and 15 to their retracted position, namely positions R and R' of FIG. 2.

Figure 8:
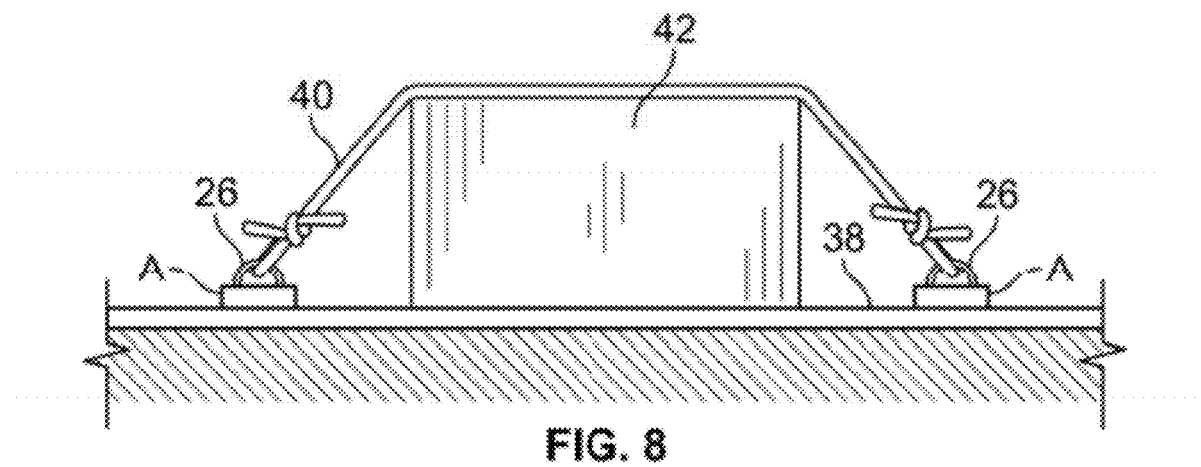
FIG. 8 is an elevational view showing the foregoing anchor being used to lash an object in place.

Anchor A may be grasped by strut 26 and placed in one of the positions shown in FIG. 8. Specifically, anchor A may be placed atop a fibrous substrate 38. Substrate 38 may be the carpeting found in a passenger automobile, truck, van, minivan, boat, airplane, or other vehicle. In some cases the anchor may attach to carpeting found in a building or other structure.

It will be understood that anchor A can work with other fibrous or penetrable substrates that may be found in other environments. For example, the substrate may be a cloth or felt covering on a wall, floor, or other structural element of a vehicle, building or other object.

Using strut 26 the user may depress thrust plate 24 causing glides 28 to push hubs 14 and 15 down from their retracted positions R and R'. As hubs 14 and 15 descend their threads 14A and 15A cause the hubs to rotate in opposite directions. Consequently, prongs N and N' are deployed beyond base 16 and simultaneously extend and rotate with hubs 14 and 15, respectively. Being helical, or approximately helical, prongs N and N' screw and anchor into the fibrous material 38. In this embodiment hubs 14 and 15 rotate 15° or less, i.e. no more than the angle u of FIG. 5. Here the angle of rotation is no more than one-twenty fourth of a turn. To make an anchor quick-acting it is advantageous to have the angle of rotation at most one-sixteenth of a turn. It will be appreciated that the relative rotation between hubs 14 and 15 will be additive, that is, 30° or less. However as a practical matter, the relative rotation need not reach its full potential angular displacement to achieve satisfactory anchoring.

The user may now move slider 34 back in slots 36A and 36B so that the edge of wall 34B is wedged against band 12 on the flange 14B of hub 14, thereby preventing rotation of hub 14. Because band 12 presses against band 13 of hub 15, hub 15 also cannot rotate.

This process is repeated with another identical anchor A so that two such anchors are positioned as shown in FIG. 8 on fibrous material 38. It will be appreciated that the position of anchors A can be finely adjusted since they may be positioned anywhere on substrate 38. A box 42 or other object is placed between the two anchors A and lash 40 may be placed over the box and tied to the anchor's struts 26. As mentioned previously, lash 40 may be a cord, strap, elastic band, line or other type of lash. Also, instead of tying, lash 40 may be secured by a hook, buckle or other fastener on the lash or on the anchor.

Accordingly, object 42 will be held securely in place during transport or for other reasons. Also as noted before, anchors A may be used to anchor stays or guy wires to keep some structure upright. Alternatively, anchors A may be used to tether a pet or something else that needs to be constrained.

Anchors A may be released by pushing slider 34 outwardly so the edge of wall 34B this engages band 12 on flange 14B of hub 14. Consequently, springs 30 drive hub 14 away from substrate 38, its threads 14A causing the hub to rotate. Since band 12 engages band 13, hub 15 will be lifted by springs 30 and rotate, but in the opposite direction. At the same time, prongs N and N' will unscrew from substrate 38 releasing the anchor A. Anchors A may then be reused in different positions.

Obviously, many modifications and variations of the present invention are possible in light of the above teachings. It is therefore to be understood that within the scope of the appended claims, the invention may be practiced otherwise than as specifically described.

The invention claimed is:

1. An anchor for fastening to a fibrous or pierceable substrate comprising:
    a base with a spaced pair of bores, each of the bores having an axis;
    a pair of hubs rotatably mounted in said pair of bores, the pair of hubs being movable in a direction along the axis of the bores between a retracted and a deployed position, each of said pair of hubs having on one side thereof a plurality of spiral prongs, the spiral prongs on a first one of the hubs spiraling away from the first one of the hubs in a first direction, the spiral prongs on a second one of said hubs spiraling away from the second one of said hubs in a second, direction, the first direction being the opposite of the second direction said hubs when in said deployed position projecting said plurality of prongs beyond said base; and
    a thrust member mounted over said pair of hubs to move toward and away from said pair of hubs, said thrust member being movable into contact with said pair of hubs to move them from said retracted to said deployed position.

2. An anchor according to claim 1 wherein said thrust member comprises:
    a plate with an arching strut.

3. An anchor according to claim 1 wherein said thrust member comprises:
    a plate with a U-shaped strut.

4. An anchor according to claim 1 wherein said pair of bores comprise one with a right hand thread and the other with a left hand thread, said pair of hubs being threaded to complement threading of said pair of bores.

5. An anchor according to claim 1 comprising:
    at least one yielding member for urging said pair of hubs toward said retracted position.

6. An anchor according to claim 5 wherein said at least one yielding member comprises a plurality of springs mounted on said base, said springs projecting from said base to engage and push said pair of hubs toward said retracted position.

7. An anchor according to claim 5 comprising:
    a locking member for moving against and stopping at least one of said pair of hubs.

8. An anchor according to claim 5 comprising:
    a locking member mounted on said base for sliding against and stopping at least one of said pair of hubs.

9. An anchor according to claim 1 wherein said pair of hubs are mounted to peripherally engage and revolve in opposite directions.

10. An anchor according to claim 9 wherein said pair of hubs have flanges that touch one another and rotate together.

11. An anchor according to claim 9 wherein said pair of bores comprise one with a right hand thread and the other with a left hand thread, said pair of hubs being threaded to complement threading of said pair of bores.

12. An anchor according to claim 11 comprising:
    a locking member mounted on said base for sliding against and stopping at least one of said pair of hubs; and
    at least one yielding member for urging said pair of hubs toward said retracted position, said thrust member having a plate with a U-shaped strut.

13. An anchor according to claim 1 wherein each of said spiral prongs turns at most $1/16$ of a turn.

14. An anchor according to claim 13 wherein each of said spiral prongs rises less than its overall exposed length.

15. A method for anchoring an object to a fibrous or pierceable substrate employing a pair of hubs with spiral prongs that spiral in opposite directions, one clockwise, one counterclockwise, the method comprising the steps of:
    placing the pair of hubs adjacent with the spiral prongs against the substrate;
    rotating the hubs in opposite directions to cause their spiral prongs to anchor to the substrate by spirally penetrating into the substrate with the spiral prongs penetrating clockwise for one of the pair of hubs, and the spiral prongs for the other one of the pair penetrating counterclockwise; and
    securing the object to both of said hubs.

16. A method according to claim 15 wherein the step of rotating the hubs is performed by rotating the hubs at most $1/16$ or a turn.

17. A method according to claim 15 wherein the step of rotating the hubs is performed by threading the hubs in a base with the threading of the hubs being right handed for one and left handed for the other, the rotation of the hubs being performed by pushing them together through the base.

18. A method according to claim 17 comprising the step of:
    locking the hubs in a fixed angular orientation.

19. A method according to claim 17 employing a thrust plate mounted to reciprocate on said base, the step of rotating the hubs being performed by pushing the thrust plate against the hubs to push them together through the base.

20. An anchor for fastening to a fibrous or pierceable substrate comprising:
- a base with a spaced pair of bores, one with a right hand thread and the other with a left hand thread, each of the bores having an axis;
- a pair of hubs rotatably mounted in said pair of bores, the pair of hubs being movable in a direction along the axis of the bores between a retracted and a deployed position, said pair of hubs being threaded to complement threading of said pair of bores, said pair of hubs having a pair of flanges that touch each other and revolve in opposite directions, each of said pair of hubs having on one side thereof a plurality of spiral prongs, the spiral prongs on a first one of the hubs spiraling away from the first one of the hubs in a first direction, the spiral prongs on a second one of said hubs spiraling away from the second one of said hubs in a second direction, the first direction being the opposite of the second direction, each of said spiral prongs turning at most $1/16$ of a turn, each of said spiral prongs rising less than its overall length, said hubs when in said deployed position projecting said plurality of prongs beyond said base;
- a thrust plate with a U-shaped strut mounted over said pair of hubs and operable to thrust them from said retracted to said deployed position; and
- a plurality of springs mounted between said base and said thrust plate; and
- a locking member mounted on said base for sliding against and stopping at least one of said pair of hubs.

* * * * *